United States Patent
Eller

(10) Patent No.: US 9,936,440 B2
(45) Date of Patent: Apr. 3, 2018

(54) SYSTEMS AND METHODS FOR AUTOMATIC TRANSMISSION RATE CONTROL IN A VEHICLE-BASED WIRELESS NETWORK

(71) Applicant: CoCo Communications Corp., Seattle, WA (US)

(72) Inventor: A. Riley Eller, Seattle, WA (US)

(73) Assignee: COCO Communications Corp., Seattle, WA (US)

(*) Notice: Subject to any disclaimer, the term of this patent is extended or adjusted under 35 U.S.C. 154(b) by 0 days.

(21) Appl. No.: 15/285,072

(22) Filed: Oct. 4, 2016

(65) Prior Publication Data

US 2018/0020392 A1  Jan. 18, 2018

Related U.S. Application Data

(60) Provisional application No. 62/361,368, filed on Jul. 12, 2016.

(51) Int. Cl.
  *H04W 4/00* (2009.01)
  *H04W 40/38* (2009.01)
  (Continued)

(52) U.S. Cl.
  CPC ............ *H04W 40/38* (2013.01); *H04L 67/34* (2013.01); *H04W 76/002* (2013.01); *H04W 76/04* (2013.01); *H04W 84/005* (2013.01)

(58) Field of Classification Search
  CPC ... H04W 40/38; H04W 76/002; H04W 76/04; H04W 84/005; H04W 12/02;
  (Continued)

(56) References Cited

U.S. PATENT DOCUMENTS 7,188,026 B2   3/2007  Tzamaloukas
7,421,248 B1 *  9/2008  Laux ............... H04L 1/0002
                                             370/352
(Continued)

OTHER PUBLICATIONS

Li, "Adaptive and Opportunistic QoS-based Routing Protocol in VANETs," https://tel.archives-ouvertes.fr/tel-01244591/document, Dec. 16, 2015, 140 pages.
Chen et al., "MobTorrent: A Framework for Mobile Internet Access from Vehicles," https://comp.nus.edu/~chanmc/papers/infocom09.pdf, 2009, 9 pages.

(Continued)

*Primary Examiner* — Timothy Pham
(74) *Attorney, Agent, or Firm* — Lowe Graham Jones PLLC

(57) ABSTRACT

Techniques for distributing content to mobile computing devices, such as in the context of a vehicle-based wireless network, are described. In some examples, a collection of vehicle-mounted devices forms a cooperative wireless network to distribute content items throughout the network. The devices in the network automatically and independently vary the transmission rates in order to optimize or at least improve throughput, network connectivity, and/or range. Each device may determine a utilization level of a wireless communication channel. If the utilization level is below a threshold level, the device increases the transmission data rate of its transceiver, thereby decreasing range. If the utilization level is above a threshold level, the device decreases the transmission data rate of its transceiver, thereby increasing range.

20 Claims, 18 Drawing Sheets

(51) Int. Cl.
*H04L 29/08* (2006.01)
*H04W 76/04* (2009.01)
*H04W 76/00* (2018.01)
*H04W 84/00* (2009.01)

(58) Field of Classification Search
CPC ..... H04W 12/08; H04W 12/12; H04W 28/02; H04W 28/26; H04W 4/06; H04W 4/12; H04W 64/006; H04L 67/34; H04L 47/10; G06F 11/2038; G08G 1/0104; H04B 1/02; H04B 1/3822; H04M 1/7253
USPC ........................................................ 455/438
See application file for complete search history.

(56) References Cited

U.S. PATENT DOCUMENTS

| | | | |
|---|---|---|---|
| 7,869,906 B2 | 1/2011 | Louch et al. | |
| 8,447,231 B2 | 5/2013 | Bai et al. | |
| 9,173,100 B2 | 10/2015 | Ricci | |
| 2015/0327028 A1* | 11/2015 | Zhang | H04W 4/12 455/452.1 |
| 2016/0183122 A1* | 6/2016 | Ruan | H04W 28/0289 370/235 |
| 2017/0063508 A1* | 3/2017 | Stalley | H04L 47/28 |
| 2017/0318489 A1* | 11/2017 | Sun | H04W 24/08 |

OTHER PUBLICATIONS

Santa et al., "A Framework for Supporting Network Continuity in Vehicular IPv6 Communications," IEEE Intelligent Transportation Systems Magazine, vol. X, No. X, Oct. 2012, 15 pages.

Bonomi et al., "The Smart and Connected Vehicle and the Internet of Things," Http://tf.nist.gov/seminars/WSTS/PDFs/1-0_Cisco_FBonomi_ConnectedVehicles.pdf, 2013, 53 pages.

Schweppe, "Security and privacy in automotive on-board networks," https://hal.archives.ouvertes.fr/tel-01157229/document, May 27, 2015, 226 pages.

Sun, "Anonymous, Secure and Efficient Vehicular Communications," A thesis presented to the University of Waterloo in fulfillment of the thesis requirement of the degree of Master of Mathematics in Computer Science, Waterloo, Ontario, Canada, 2007, 67 pages.

Do et al., "A scalable video-on-demand streaming system in hybrid wireless mobile peer-to-peer networks," http://dsg.eecs.ucf.edu/Portals/0/publications/2009/PatchPeer.pdf, Feb. 24, 2009, 20 pages.

Goel et al., "Ascertaining viability of WiFi based vehicle-to-vehicle network for traffic information dissemination,"https://www.researchgate.net/profile/Kaan_Ozbay/publication/224756455_Ascertaining_viability_of_WiFi_based_vehicle-tovehicle_network_for_traffic_information_dissemination/links/0912f50f869450fa72000000.pdf Publication date via IEEE: http://ieeexplore.ieee.org/xpl/login.jsp?tp=&arnumber=1399058&url=http%3A%2F%2Fieeexplore.ieee.org%2Fxpls%.

* cited by examiner

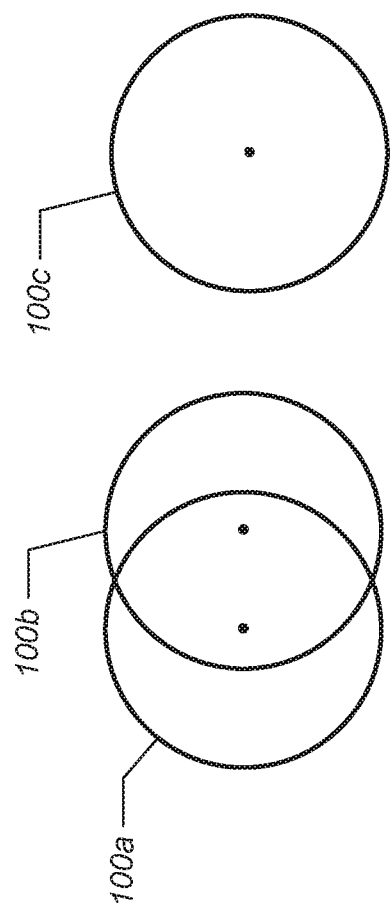

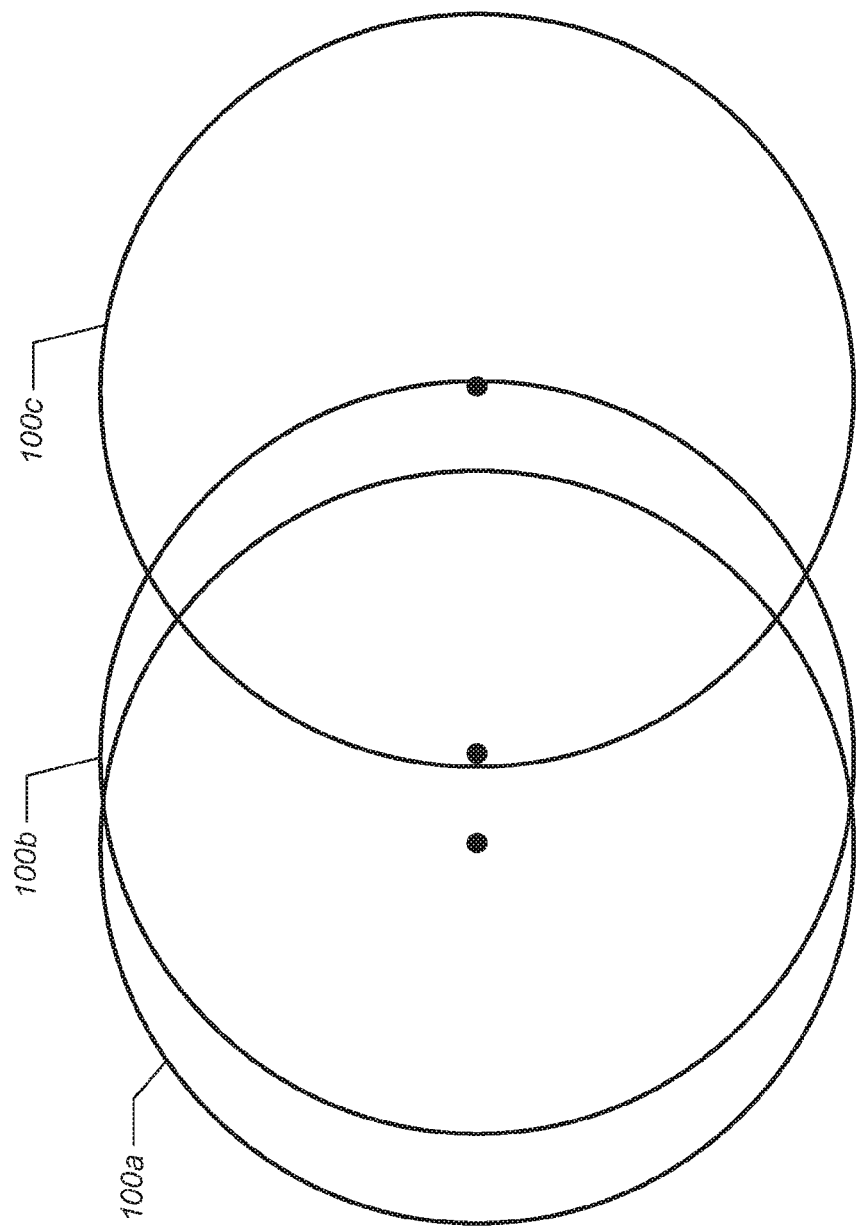

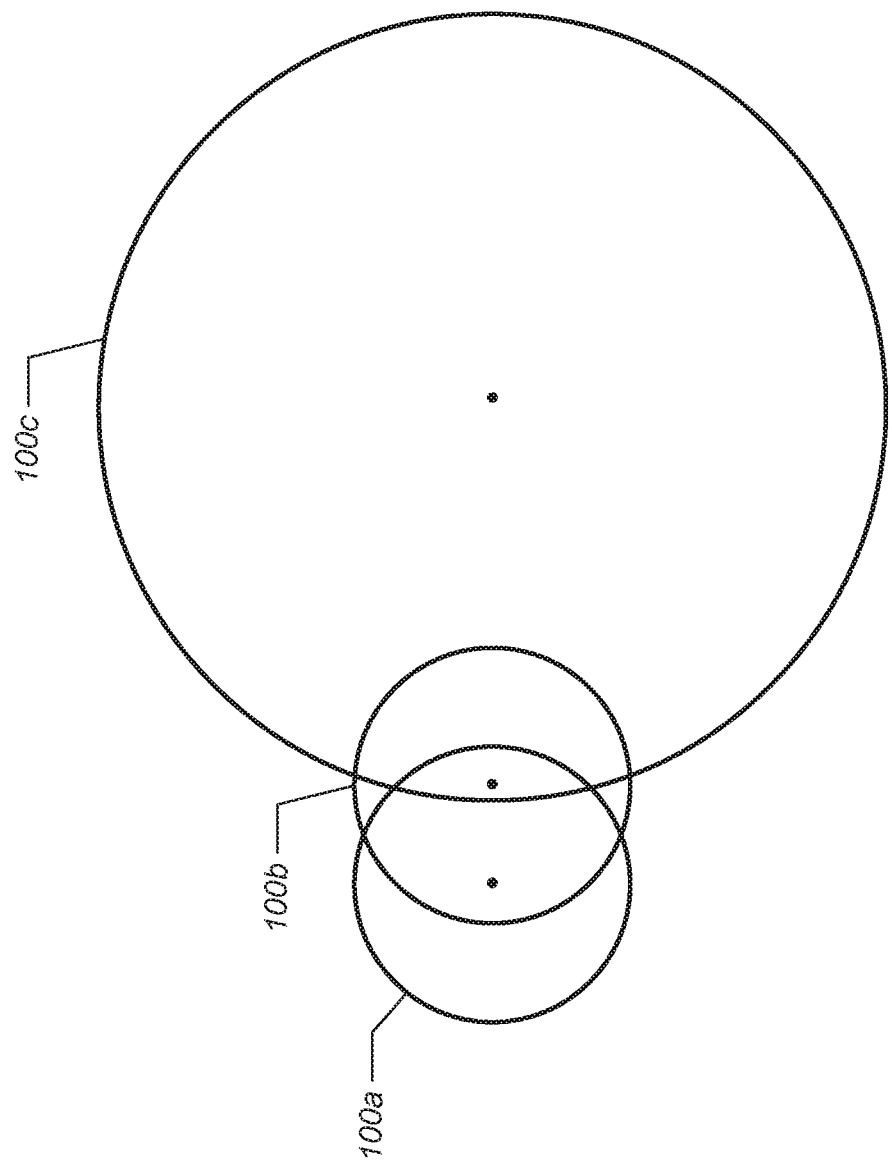

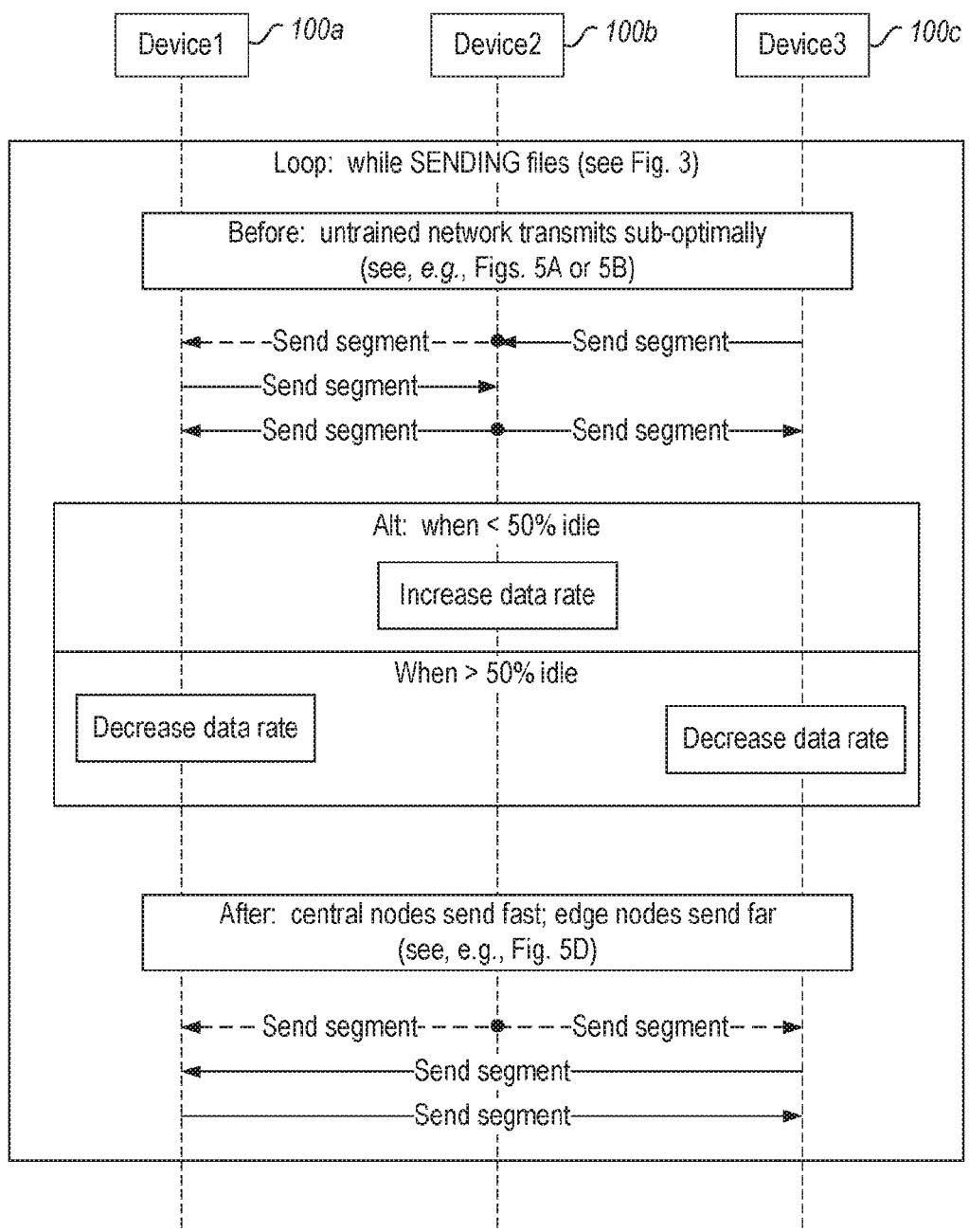

Fig. 6B

6B00: The process of *6A00*, further comprising:

6B01: Receiving from the content distributor an announcement that identifies the content item, the announcement received via the cellular network

6B02: In response to the announcement, transmitting a request via the cellular network to the content distributor for the identified item

6B03: Receiving from the content distributor proofs configured to authenticate the content item, the proofs received via the cellular network

6B04: Receiving, via the cellular network, the content item from the content distributor

Fig. 6C

6C00: The process of *6B00*, further comprising:

6C01: Authenticating the source and content of the content item based on the proofs received from the content distributor

Fig. 6F

6F00: The process of 6A00, further comprising:

6F01: Repeatedly transmitting, via the Wi-Fi network, randomly selected portions of the content item, wherein the transmission is a broadcast transmission that reaches multiple other vehicle-based communication devices that are part of the Wi-Fi network

Fig. 6G

6G00: A process for distributing content in a vehicle-based wireless network

6G01: Transmitting, via a cellular network, an announcement, proofs, and a content item to a first subset of devices in the vehicle-based wireless network

6G02: Causing devices in the first subset of devices to transmit, via a Wi-Fi network, portions of the content item to devices in a second subset of devices in the vehicle-based wireless network

6G03: Transmitting, via the cellular network, remaining portions to the devices in the second subset of devices

Fig. 6H

6H00: The process of *6G00*, further comprising:

6H01: Tracking distribution of the content item throughout the vehicle-based network

6H02: In response to the distribution of the content item reaching a threshold level, transmitting the remaining portions to the devices in the second subset

Fig. 6I

6I00: The process of *6G00*, further comprising:

6I01: Receiving, by a roadside communication device and via the Wi-Fi network, a content portion from a first vehicle-based communication device

6I02: Transmitting, by the roadside communication device and via the Wi-Fi network, the content portion to a second vehicle-based communication device

Fig. 6L

6L00: The process of 6J00, further comprising:

6L01: Receiving, via a second wireless transceiver of the first device, a content item from a content distributor

6L02: Transmitting, via the first wireless transceiver using the transmission data rate, portions of the content item to other vehicle-based communication devices in the network

Fig. 6M

6M00: The process of 6J00, further comprising:

6M01: Automatically adjusting transmission data rate when the first device is in close proximity to other devices in the network, such that the first device transmits at a higher rate over a shorter distance relative to other devices in the network that that are not in close proximity to other devices

SYSTEMS AND METHODS FOR AUTOMATIC TRANSMISSION RATE CONTROL IN A VEHICLE-BASED WIRELESS NETWORK

PRIORITY CLAIM

This application claims the benefit of U.S. Provisional Patent Application No. 62/361,368, entitled "SYSTEMS AND METHODS FOR DISTRIBUTING CONTENT IN A VEHICLE-BASED WIRELESS NETWORK" and filed on Jul. 12, 2016, the content of which is incorporated herein by reference in its entirety.

TECHNICAL FIELD

The present disclosure relates to methods, techniques, and systems for distributing content to mobile computing devices and, more particularly, to methods, techniques, and systems for efficiently distributing content over a vehicle-based wireless network, by automatically varying the transmission rates employed by communication devices in a given network in order to optimize or improve throughput, network connectivity, and/or range.

BACKGROUND

Content providers, such as vehicle manufacturers, fleet operators/managers, media providers and other entities and organizations, have a need to distribute content items to vehicles. For example, a vehicle manufacturer may desire to update software for one or more subsystems (e.g., engine control, media center, navigation system) in a particular model of car. Historically, such an update was only possible via a manual update performed by a technician in a service center.

Vehicles increasingly include wireless communication devices that enable communication via the cellular phone network, Wi-Fi, Bluetooth, or the like. These additional communication mechanisms allow content providers to distribute content items "over the air," while vehicles are in the field, without requiring the physical presence or manual intervention of a technician, operator, owner or other party.

FIGS. 1A and 1B illustrate a prior art approach to the over the air distribution of content items to vehicles using a cellular wireless network. In FIG. 1A, a carrier 110 operates a cellular network, which is used by a content provider 112 transmit content item A to each of multiple cars 101a-101e. To transmit the content item to, for example, car 101a, the content provider 112 connects (via the carrier 110) to a cellular communication device (not shown) the car 101a, and then transmits the content item via the established connection. This process is repeated for each and every car 101a-101e. In this example, the content provider 112 transmits content item A five times in all, once to each car 101a-101e.

FIG. 1B is a sequence diagram that illustrates the prior art content distribution process. In FIG. 1B, the carrier 110 communicates with each of multiple communication devices 102a-102c. The communication devices 102a-102c may be cellular communication devices that are each installed in a corresponding vehicle. The carrier transmits the entire content item to each of the devices 102a-102c via a dedicated connection. As carrier charges are typically based on the amount of data transmitted, the distribution cost of one content item is proportional to the number of destination devices (vehicles).

BRIEF DESCRIPTION OF THE DRAWINGS

FIGS. 4A-4D illustrate automatic rate control according to an example embodiment.

FIG. 5 is a sequence diagram that illustrates an automatic rate control process according to an example embodiment.

FIGS. 6A-6M are example flow diagrams of content distribution processes performed by example embodiments.

DETAILED DESCRIPTION

Embodiments described herein provide enhanced computer-and network-based methods, devices, and systems for efficiently distributing content to mobile computing devices and, more particularly, to methods, techniques, and systems for efficiently distributing content over a vehicle-based wireless network.

In the following, Section 1 provides an overview of a content distribution architecture. Section 2 describes a content distribution process implemented by some embodiments. Section 3 describes automatic rate control techniques, in which communicating devices independently vary their transmission rates in order to optimize or at least improve throughput, network connectivity, and/or range.

1. Overview

Figure 1A:
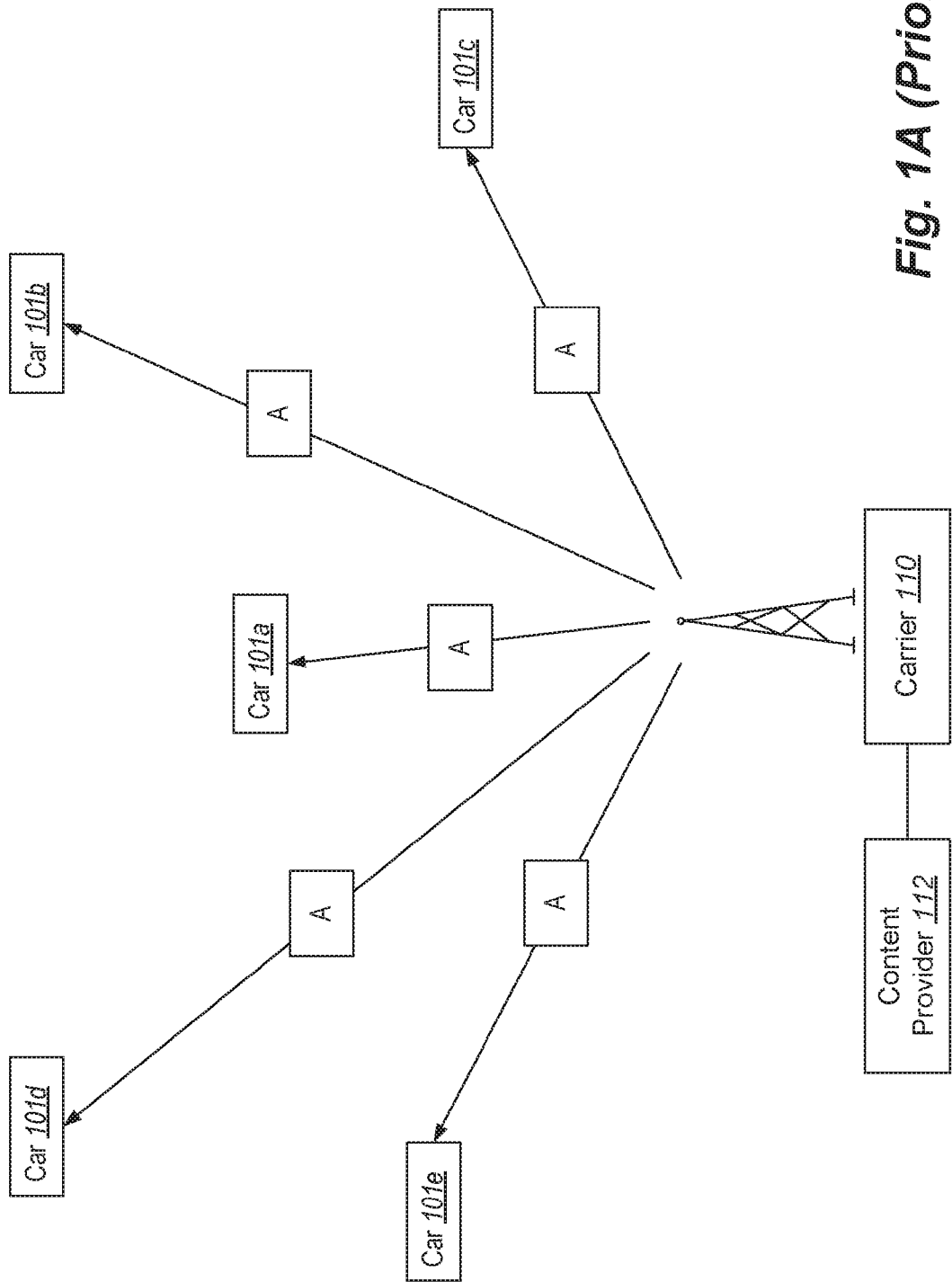
FIGS. 1A and 1B illustrate a prior art approach to the distribution of content items to vehicles using a cellular wireless network.
Figure 1B:
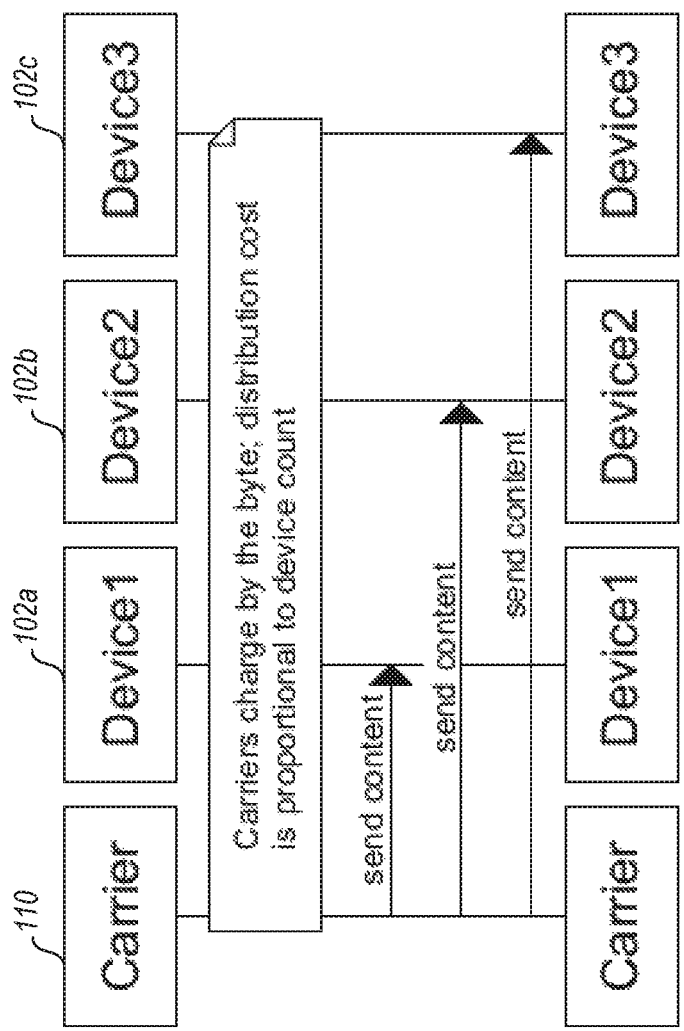
Figure 2A:
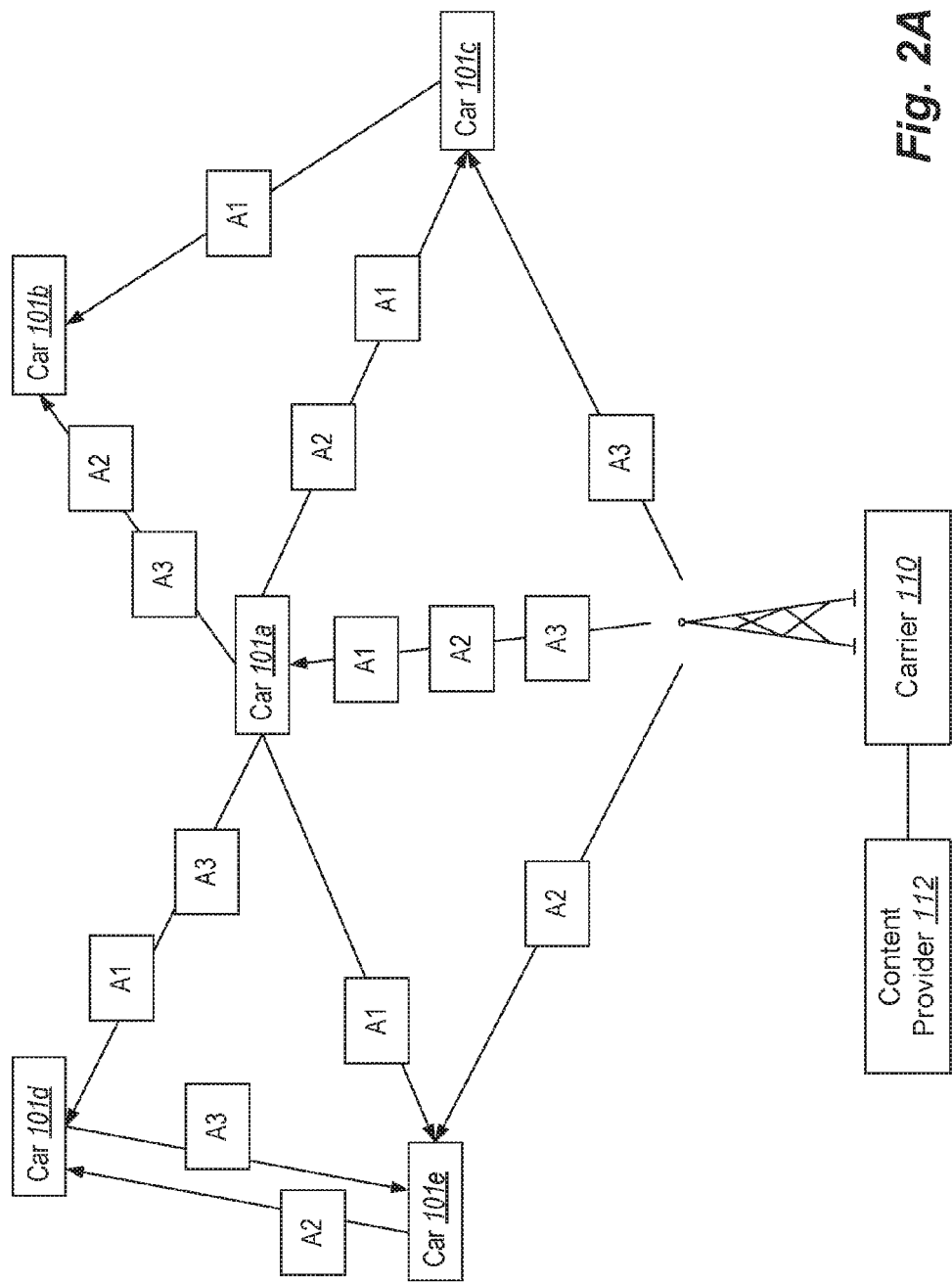
FIGS. 2A and 2B illustrate the distribution of content items to vehicles according to an example embodiment.
Figure 2B:
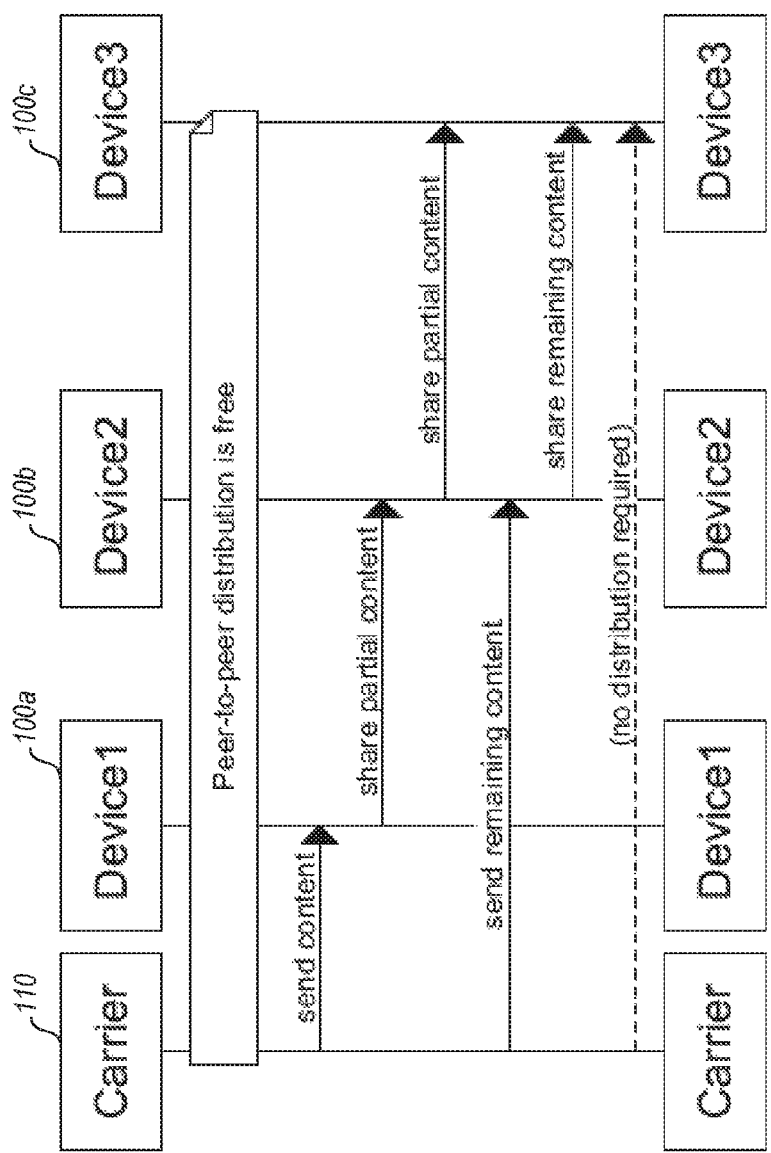

FIGS. 2A and 2B illustrate the distribution of content items to vehicles according to an example embodiment. In contrast to the prior art approach described with respect to FIG. 1A, the content item is transmitted in FIG. 2A by the carrier 110 to a subset of the cars 101a-101e, from whence it is then further distributed to other cars via a second network, such as via one or more Wi-Fi network established amongst the cars 101a-101e.

In the example of FIG. 2A, the content provider 112 uses the cellular network managed by the carrier 110 to initially transmit content item A to car 101a. Content item A is decomposed into portions (also referred to as "segments"). In this example, content item A is decomposed into three portions, A1, A2, and A3. Segmenting the content item allows for improved restart behavior in the face of dropped transmissions, because the entire content item need not be retransmitted. In addition, segmenting the content item allows for multiple distinct entities to operate as sources for various portions of the content item, thereby enabling a peer-to-peer distribution technique described herein.

Once car 101a has received one or more of the portions A1-A3, the car 101a can begin distributing the received portions to other cars. In this example, car 101a transmits, via one or more Wi-Fi networks, portions A2 and A3 to car 101b; portions A1 and A2 to car 101c; portions A1 and A3 to car 101d; and portions A1 to car 101e.

The portions transmitted by from one car to another may be selected in various ways. In a preferred embodiment, the portions are selected at random. For example, car 101a may randomly select portion A1 and then broadcast that portion via a Wi-Fi transceiver. Any other cars that are within the range of the Wi-Fi transmission from car 101a will receive the portion A1. Having transmitted portion A1, car 101a selects another portion for transmission, and so on. In some embodiments, a transmitted portion will not be retransmitted until all of the other portions have been transmitted at least once. Once car 101a has transmitted all of portions A1-A3 at least once, it may once again begin to randomly distribute that set of portions. In other embodiments, car 101a continuously transmits the portions A1-A3 in sequence instead of via random selection.

As the other cars 101b-101e receive portions of the content item, they too begin distributing the received portions to other cars. For example, car 101c, having received portion A1 from car 101a, transmits that portion to car 101b. Also, car 101e and car 101d exchange portions A2 and A3.

Note that the content provider 112 may use the cellular network of the carrier 110 to transmit portions to cars other than car 101a. In some cases, one or more portions of content item A may be "pushed" to other cars, in order to seed more cars with portions of the content item. Alternatively, the portions may be transmitted in an on-demand manner. For example, car 101c, understanding that it has not yet received content portion A3 from a neighboring car, may request and obtain content portion A3 from the content provider 112 via the cellular network.

Note that in some embodiments, the content provider 112 will interact (via carrier 110) with each of cars 101a-101e in order to guarantee that each and every car has received the content item. For example, the content provider 112 may initially transmit the entire content item to some subset of the cars 101a-101e. Then the content provider 112 will wait in order to allow the initial subset of cars to share their content via their Wi-Fi transceivers. The wait time may be predetermined (e.g., 4, 8, 24 or 48 hours) or based on conditions (e.g., when the average car has received at least N % of the content).

For example, the content provider 112 can periodically sample a subset of the cars in order to estimate how much of the content item has been distributed. When more than a specified fraction of the content item has been distributed, the content provider 112 can then in a further interaction (via the carrier) to transmit remaining content portions to those cars that require them. In another approach, the content provider 112 monitors the rate of change of the distribution of the content item. For example, the content provider can monitor (via sampling) the number of bytes received per unit time by an average car. Then, when the rate drops below some threshold, begins to plateau, or matches some other condition, the content provider 112 engages in further interaction (via the carrier) to transmit any remaining content portions.

Note that by employing such conditional distribution, the content provider 112 can trade off carrier costs for time in a reasonable precise manner. For example, by waiting until cars have received (via sharing) 50% of the content item, the carrier can expect to save about 50% in carrier costs.

FIG. 2B is a sequence diagram that illustrates the content distribution process of FIG. 2A. In FIG. 2B, the carrier 110 communicates with each of multiple communication devices 100a-100c. In the context of FIG. 2A, the communication devices 100a-100c may be multi-network communication devices that are each installed in a corresponding vehicle. In other contexts, the communication devices may be personal mobile devices (e.g., smart phones) that are carried by human users. A multi-network communication device 100 is described in greater detail with respect to FIG. 7, below.

In the scenario of FIG. 2B, the carrier 110 transmits the entire content item to device 100a. Device 100a then transmits at least some of the content item to device 100b. As noted above, the content shared by device 100a may be selected at random, or by some other mechanism. Device 100b obtains the remainder of the content item from the carrier 110, such as by transmitting a request for one or more missing portions to the carrier 110. In addition, device 100b transmits the content item to device 100c, such as by transmitting the portions received from device 100a and directly from the carrier 110.

Note that in the examples of FIGS. 2A and 2B, the content provider does not transmit any portions of the content items to one or more remote devices. For example, in FIG. 2A, cars 101d and cars 101b obtain the entire content item (portions A1-A3) from other cars, without needing to interact with (and correspondingly utilize the cellular network) the content provider at all. Also, in FIG. 2B, device 100c obtains the content item entirely from device 100b, and does not interact with the carrier 110 in any way.

Multi-network communication devices may also be fixed in location. For example, in a transportation related context, such devices may be located near roadways to facilitate the distribution of content and/or other data (e.g., traffic flow data, warnings, road conditions data) to vehicles in the network. In a personal mobile device context, some fixed position devices may also be employed to facilitate the distribution of content. For example, devices may be located throughout a workplace, university campus, factory, or other facility, such that they can transmit and receive data to and from personal mobile devices. Fixed-location devices may have all or some of the characteristics of the described mobile devices, as discussed herein. Specifically, they may be multi-network devices that behave in a manner similar to mobile devices, in that they may receive content from the content distributor (via a cellular network) and forward that content to other devices (via a Wi-Fi network). They may also transmit (via Wi-Fi) content portions received (via Wi-Fi) from passing vehicles to other vehicles.

2. Content Distribution

Figure 3:
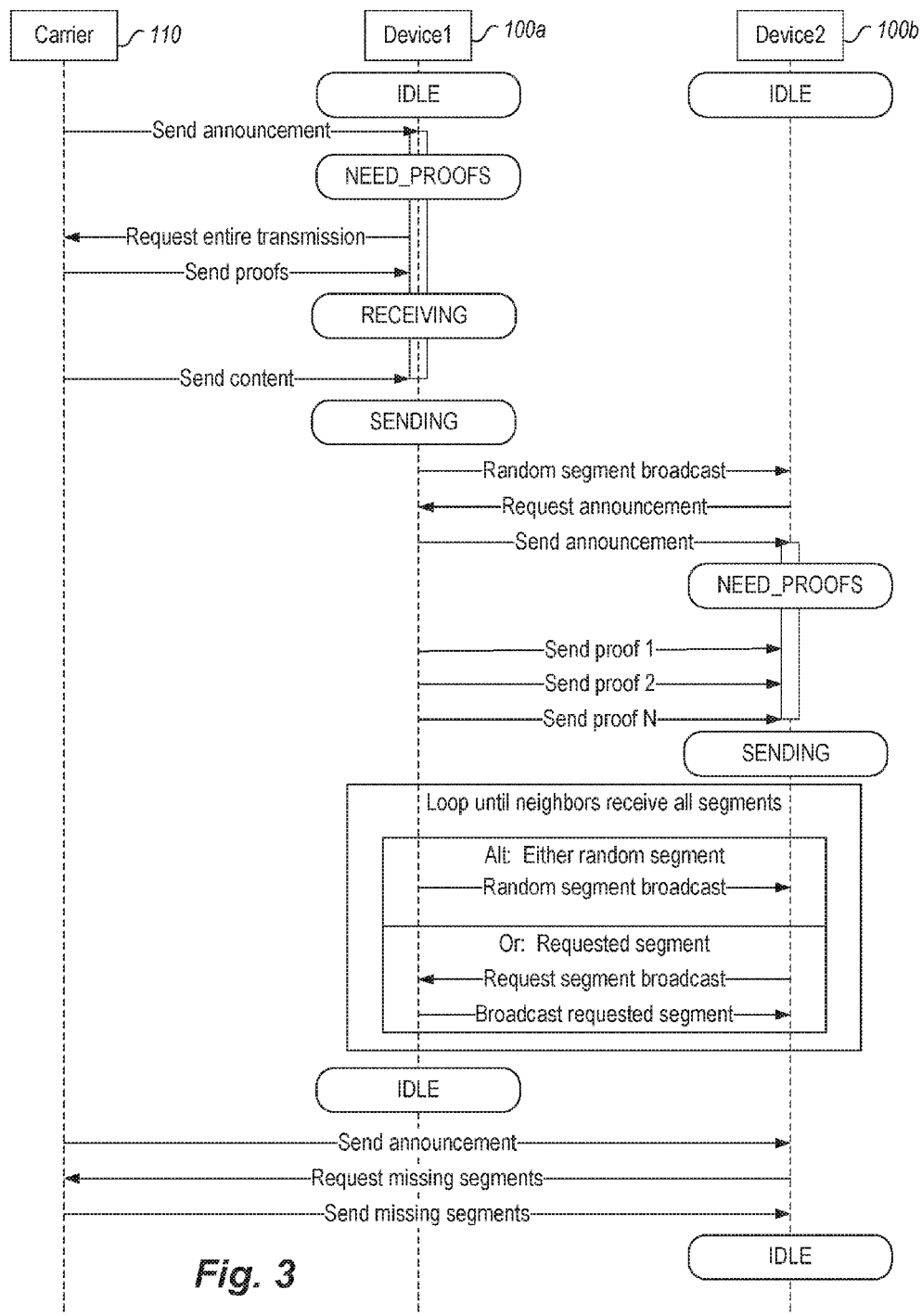
FIG. 3 is a sequence diagram that illustrates a content item distribution process according to an example embodiment.

FIG. 3 is a sequence diagram that illustrates a content item distribution process according to an example embodiment. More particularly, FIG. 3 shows interactions between a carrier 110 and two multi-network communication devices 100a and 100b.

First, the carrier 110 transmits an announcement to device 100a. The announcement is typically a message that identifies the content item that is being distributed by the carrier 110. The message is typically signed by the carrier 110 and/or the content provider 112, so that device 100a can evaluate the authenticity and source of the message.

Once device 100a receives the announcement, it determines that it has not yet received the identified content item or any portions thereof. In response, the device 100a transmits to the carrier 110 a request for the entire content item. In response, the carrier 110 transmits to the device 100a a set of proofs and the content item. The proofs securely identify the portions that form the content item being distributed. The proofs allow the device 100a (or some other device) to verify the authenticity and/or content of each of the portions, such as by including cryptographic hashes of each of the content items. In one embodiment, the proofs are based on a hash tree, also known as a Merkle tree. The leaves of the tree are hashes of each of the content portions, while each internal node of the tree is a hash of the concatenation of the hashes of the child nodes. The root node hash is typically digitally signed by the carrier or content distributor, so that the root hash can be verified as authentic. Given an authentic root node, other nodes need not be obtained from a trusted source or otherwise signed, because their integrity and authenticity can be ultimately verified with respect to the root hash. The advantage of using a hash tree is that a device 100*a* can authenticate and/or verify the integrity of any received content portion without having received the entire tree, thereby enabling random distribution of content portions. For example, to authenticate a single content portion, a device need only have possession of the content portion and the branch of the tree between the tree root and the content portion.

Next, the carrier 110 begins to transmit to the device 100*a* the content item, typically by transmitting the content portions in sequence. Once the device 100*a* has received at least some of the content portions, device 100*a* begins to randomly broadcast portions to neighboring devices.

In this example, device 100*b* receives a first portion. Each portion identifies its corresponding content item (e.g., a unique filename of the content item). Having never received the identified content item, device 100*b* requests the corresponding announcement and proofs from device 100*a*. In response, device 100*a* forwards the announcement and proofs to device 100*b*.

Device 100*a* executes a distribution loop in which it shares the content item with its neighbors. The content item is shared by randomly selecting and broadcasting content portions and/or responding to requests for specific content portions. Different types of requests are contemplated. For example, device 100*b* may transmit (e.g., broadcast) a request that includes a content identifier and one or more portion identifiers (e.g., a segment list). Such a request may be transmitted, for example, if device 100*b* seeks one or more content portions in order to complete a particular content item.

The operation and termination of the distribution loop performed by device 100*a* may be governed by various factors. For example, the loop may operate for a length of time, such as may be specified by the announcement for the content item. Alternatively, the loop may operate until demand (e.g., as measured based on the number of requests for content portions) falls below a specified level (e.g., less than one request per minute. In another embodiment, the loop may operate until peer vehicles have received at least a specified average fraction or share of the total number of content portions (e.g., until each device has received at least 90% of the portions). The number of portions received by devices may be determined by incorporating in a request for a specific portion the number of received (or missing) portions. In some embodiments, the distribution loop performs random distribution until some stopping condition is reached (e.g., neighboring devices have received at least 90% of the portions), and then continues the distribution loop only in an on-demand mode, in which requests for specific portions are serviced but no random distribution takes place. After termination of the distribution loop, device 100*a* enters an idle state, in which it awaits further announcements, instructions, and/or requests.

Device 100*b* also receives the announcement from the carrier 110, which triggers an interaction in which the device 100*b* can request missing portions from the carrier 110. In other embodiments, the device 100*b* initiates the process of obtaining missing portions from the carrier 110 without awaiting the announcement or other initial communication from the carrier 110. This interaction between device 100*b* and the carrier 110 allows the content provider to assure that every device has received the entire content item. Such an additional interaction may be required in order for the content provider to comply with regulations that require certain content to be distributed to every vehicle in a specified set of vehicles (e.g., a fleet, all vehicles of a given make/model/year, all vehicles in a given geographic location, etc.).

In some embodiments, after a passage of time or occurrence of other condition, the content provider takes action to assure that every device has received the content item. For example, after a certain number of hours pass, the content provider initiates communication (via the cellular network) with each of the devices to provide any missing portions.

3. Automatic Rate Control

FIGS. 4A-4D illustrate automatic rate control according to an example embodiment. Some embodiments independently vary the transmission rates employed by each of the communication devices in a given network in order to optimize or at least improve throughput, network connectivity, and/or range.

Figure 4A:
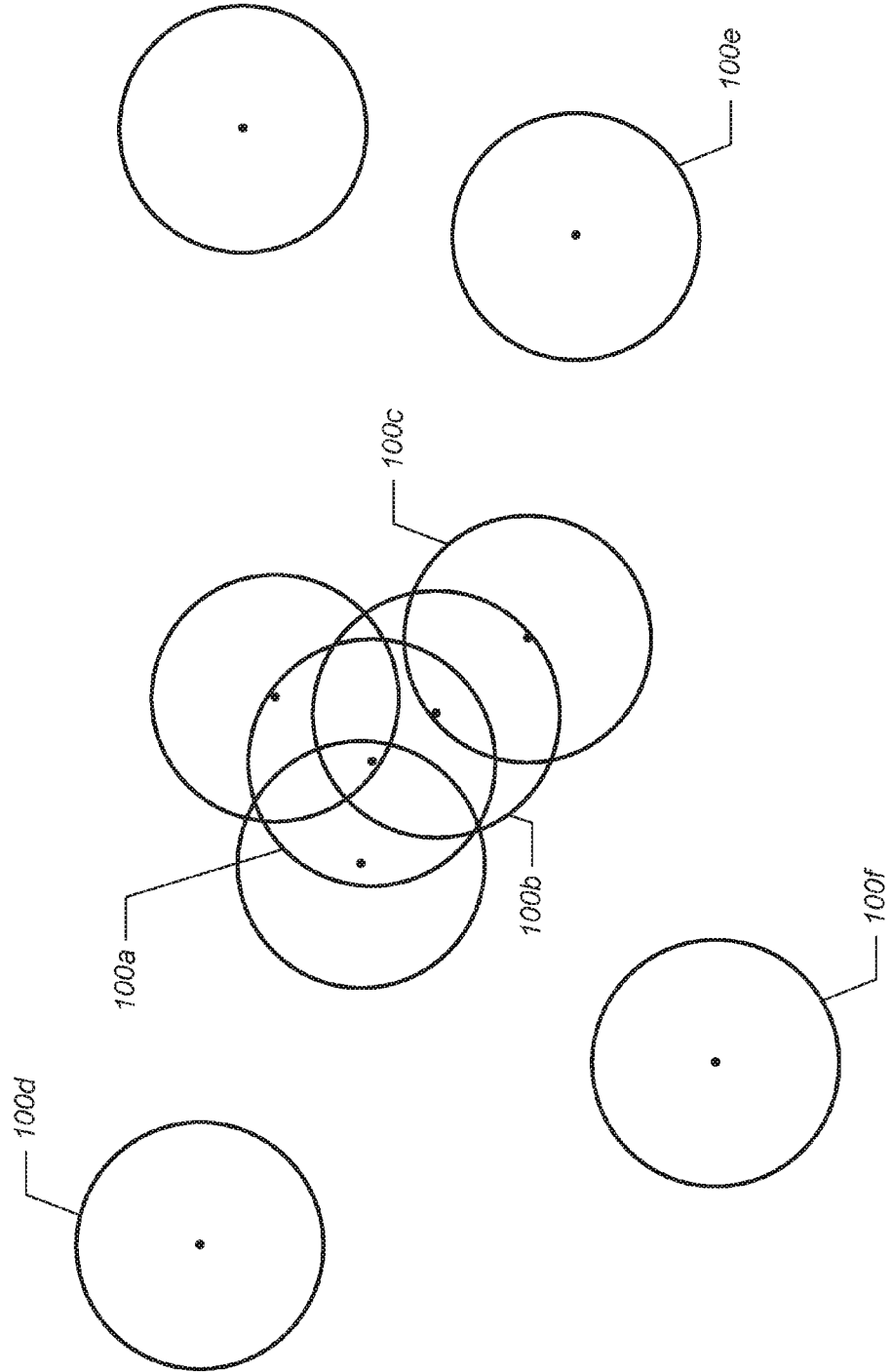

FIG. 4A illustrates a problem associated with the use of uniform transmission rates. FIG. 4A depicts a collection of devices. Each device is represented as a dot (point) centered in a circle. The circle represents the transmission range of a given device. When a circle of a first device encompasses a dot that represents a second device, the first device is capable of transmitting data to the second device. Similarly, when a circle of a first device does not encompass a dot that represents a second device, the first device is not capable of transmitting data to the second device.

FIG. 4A illustrates an example distribution of nodes in a dynamic mobile network, such as a vehicle-based network described herein. As can be seen, the nodes in the illustrated network are not uniformly distributed. Some nodes, such as devices 100*a*-100*c*, are located within a cluster of nodes. Each of the devices 100*a*-100*c* are capable of transmitting data to at least one other device, as illustrated by the fact that the circles of 100*a*-100*c* each encompass at least one other dot.

Other nodes, such as devices 100*d*-100*f*, are located in fringe regions. Devices 100*d*-100*f* are not capable of transmitting data to any other devices, and are thus effectively excluded from the illustrated network. Of course, it is possible to increase the transmission range of each of the devices, so that network connectivity and reach is improved. Range can be increased in different ways, such as by increasing transmission power. At a given power level, range can be increased by lowering the data rate. There is an inverse relationship between data rate and range. For example, 54, 24, 12 Mbps transmissions may respectively have outdoor ranges of 35, 100, and 200 meters. Given that regulations typically limit the maximum transmission power that can be used by wireless radios, modifying data rate is in some contexts the preferred way to modify transmission range.

In the example of FIG. 4A, simply decreasing the data rate of all radios will cause the overall performance of the network to suffer, given the inverse relationship between transmission range and data rate (when power is held constant). In particular, if every device increases transmission range (at a cost of lower data rate), the devices would be more completely connected but at the cost of lower transmission rates for each of the devices. As will be discussed further below, the described automatic rate control techniques address this problem by independently and dynamically modifying the date rates employed by each device.

FIGS. 4B-4D illustrate the problem and proposed solution in the context of a small example network that includes only three devices 100*a*-100*c*, for purposes of exposition.

FIG. 4B illustrates the problem introduced with respect to FIG. 4A. In FIG. 4B, devices 100a-100c each employ a uniform data transmission rate that is relatively high, but correspondingly short in range. Devices 100a and 100b are located within transmission range of one another, while device 100c is out of range of devices 100a and 100b.

FIG. 4C illustrates a naïve solution to the problem of FIG. 4B. In FIG. 4C, devices 100a-100c each employ a uniform data transmission rate that is relatively low (e.g., compared to that of FIG. 4B), but correspondingly long in range. Thus, each device is able to transmit to at least one other device. The increased transmission range results in full connectivity at the expense of lower transmission data rates.

FIG. 4D illustrates a preferred solution to the problem of FIG. 4B. In FIG. 4D, devices 100a-100c each employ a data transmission rate that is tuned to provide high connectivity in addition to high data rates where possible. For example, the tightly clustered devices 100a and 100b employ a high data rate (with a corresponding short range), while the fringe device 100c employs a low data rate (with a corresponding long range). In FIG. 4D, each device is able to transmit to at least one other device, but at least some of the devices are able to transmit data at rates higher than those employed in FIG. 4C, yielding an aggregate performance increase.

FIG. 5 is a sequence diagram that illustrates an automatic rate control process according to an example embodiment. The automatic rate control process described with respect to FIG. 5 seeks to obtain configurations similar to the one shown with respect to FIG. 4D, where each device employs a data rate that is adapted to dynamic geospatial layout of a network of devices. In general, upon the operation of the illustrated process, tightly clustered devices will transmit at high data rates and correspondingly short ranges, while fringe devices will transmit at low data rates and correspondingly long ranges.

In FIG. 5, three devices 100a-100c dynamically adjust data rates in order to optimize or improve network performance and reachability. In this example, from spatial perspective, devices 100a and 100c are fringe nodes, while device 100b is more centrally located.

The operations of the process of FIG. 5 typically take place in the context of an encompassing peer-to-peer distribution process, such as that described with respect to FIG. 3. In an initial condition, the devices 100a-100c transmit data in a sub-optimal manner, as described with respect to FIGS. 5A and 5B. Device 100a can directly communicate with device 100b, but not device 100c. Similarly, device 100c can directly communicate with device 100b, but not device 100c. Due to this connectivity restriction, a portion transmitted by device 100c to device 100a must first be transmitted to device 100b, which then further transmits it to destination device 100a. While it is at least possible in this scenario for device 100c to transmit data to device 100a, such communication likely results in a performance penalty due to the additional required "hop" through device 100b, in addition to the additional burden placed on the resources of device 100b itself.

In order to improve connectivity and performance, each device 100a-100b adjusts its data rate according to the following logic. Each device monitors the current carrier or medium utilization level, here expressed as the fraction of time that the "air" (radio channel or frequency used for communication with other devices) is idle. If the carrier is less than 50% idle, the data rate is increased. This is a condition that will typically be experienced by devices located in a cluster of devices, where many devices are competing for use of the carrier. By increasing the data rate, the transmission range for the device will decrease and the fraction of idle time will increase. In the scenario of FIG. 4A, this will have the effect of "shrinking" the circles (representing transmission distance) corresponding to the devices in the center cluster. As a result, the clustered devices will be able to communicate with one another at high data rates.

On the other hand, if the carrier is more than 50% idle, the data rate is decreased. This is a condition that will typically be experienced by devices located on the fringes of the network or otherwise far removed from other devices. By decreasing the data rate, the transmission range for the device will increase and the fraction of idle time will decrease. In the scenario of FIG. 4A, this will have the effect of "growing" the circles (representing transmission distance) corresponding to the isolated devices on the fringes. As a result, the fringe devices will be able to communicate with devices in the inner cluster and/or other fringe devices. Overall, by selectively modifying data transmission rates at each device depending on conditions sensed by the device, network connectivity and aggregate performance are increased.

Note that the above-described process operates continuously, such that changing conditions will lead to device-level adjustments. In mobile networks, the spatial arrangement of the communicating devices typically changes over time. For example, in a vehicle based network, cars along a section of road become compressed around traffic lights or stop signs, while those same cars spread out along the open stretches of road. In such cases, each vehicle-based device will continuously monitor the idle level and make adjustments accordingly, thereby reacting dynamically to changes in the physical arrangement of the vehicles.

The above-described techniques can be modified in other embodiments. For example, different thresholds can be employed. Thus, rather than using 50% idle as the threshold for increasing/decreasing data rate, other thresholds may be employed (e.g., 30%, 40%, etc.) Also, data rate may be increased in various ways or rates, such as in a linear or non-linear manner based on the difference between the detected actual idle level and the threshold idle level. Device reactivity may also be dampened, such as by measuring an average idle level over a specified time period (e.g., 5, 10, or 30 seconds).

As noted, transmission range may also be modified by adjusting radio transmission power. Some embodiments may increase transmission range by increasing transmission power, possibly in combination with a decrease in data rate.

4. Example Processes

FIGS. 6A-6M are example flow diagrams of content distribution processes performed by example embodiments.

Figure 6A:
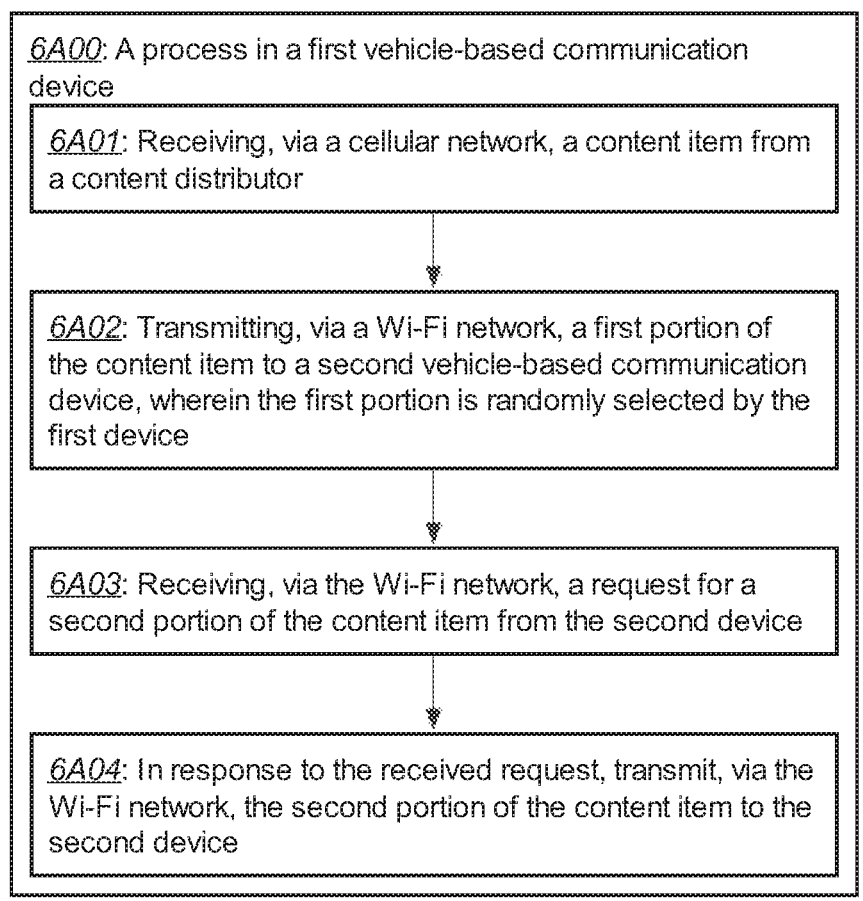

FIG. 6A is a flow diagram of example logic in a first vehicle-based communication device. The illustrated logic in this and the following flow diagrams may be performed by, for example, the content distribution module 200 and/or other devices or systems, such as the content provider computing system 60 described with respect to FIG. 7, below. This particular process manages the peer-to-peer distribution of content as described with respect to FIG. 3, above. More particularly, FIG. 6A illustrates a process 6A00 that includes the following block(s).

Block 6A01 includes receiving, via a cellular network, a content item from a content distributor. The process receives the content item from the content distributor via a cellular network, such as a GSM, UMTS, or LTE network. In some embodiments the process need only receive a portion of the content item prior to beginning to further distribute the content item to other devices. The content item may be code, data, personal media, or the like.

Block 6A02 includes transmitting, via a Wi-Fi network, a first portion of the content item to a second vehicle-based communication device, wherein the first portion is randomly selected by the first device. The second network is typically a Wi-Fi network. In a vehicle-based context the second network may be a 802.11p network or similar designed for vehicle-based operation. The content item is broken up into portions, which may be of fixed or variable size. The transmitted portion is selected as random, as the process does not necessarily have any knowledge of what portions have already been received by nearby devices. The transmission typically takes the form of a broadcast, so that multiple nearby devices may receive the benefit of the transmission of a single portion. The first portion is transmitted as a "push" transmission, that is, it is transmitted not in response to any request for the portion received from other devices.

Block 6A03 includes receiving, via the Wi-Fi network, a request for a second portion of the content item from the second device. The process is also configured to provide portions in an "on demand" manner to nearby devices. In this way, when a nearby device seeks to complete a content item by obtaining a last few missing portions, the nearby device can broadcast a request for a specific portion.

Block 6A04 includes in response to the received request, transmit, via the Wi-Fi network, the second portion of the content item to the second device. Again, the transmission here may be in the form of a broadcast so that some other devices may also receive the requested portion.

FIG. 6B is a flow diagram of example logic illustrating an extension of process 6A00 of FIG. 6A. More particularly, FIG. 6B illustrates a process 6B00 that includes the process 6A00, and which further includes the following block(s).

Block 6B01 includes receiving from the content distributor an announcement that identifies the content item, the announcement received via the cellular network. These operations typically precede the transmission of the content item itself, as described above. The announcement is a message that identifies the content item for distribution, and possibly the source or other metadata related to the content item. The announcement may itself be cryptographically signed, so that its source can be authenticated.

Block 6B02 includes in response to the announcement, transmitting a request via the cellular network to the content distributor for the identified item. Having received the announcement, the process responds to the content distributor with a request for the identified content item, if it has not already received it from another source, such as some other vehicle-based device.

Block 6B03 includes receiving from the content distributor proofs configured to authenticate the content item, the proofs received via the cellular network. The process receives a set of proofs, which include data that can be used to verify the content (e.g., that the content has not been corrupted) and/or the source of the content (e.g., the identity of the content provider or some other party that is the author or provider of the content). As discussed above, Merkle proofs may be employed to provide at least some of this functionality.

Block 6B04 includes receiving, via the cellular network, the content item from the content distributor. Typically, after using the proofs to authenticate the source of the content item, the process receives the content item via the first network. The content item may be broken up into portions, such that receivingt the content item includes receiving multiple separate portions of the content item.

FIG. 6C is a flow diagram of example logic illustrating an extension of process 6B00 of FIG. 6B. More particularly, FIG. 6C illustrates a process 6C00 that includes the process 6B00, and which further includes the following block(s).

Block 6C01 includes authenticating the source and content of the content item based on the proofs received from the content distributor. Authenticating the source and content may include operations such as verifying a digital signature and/or message digest. The integrity of the content item may be checked incrementally (e.g., as portions are received) or once the entire content item is received.

Figure 6D:
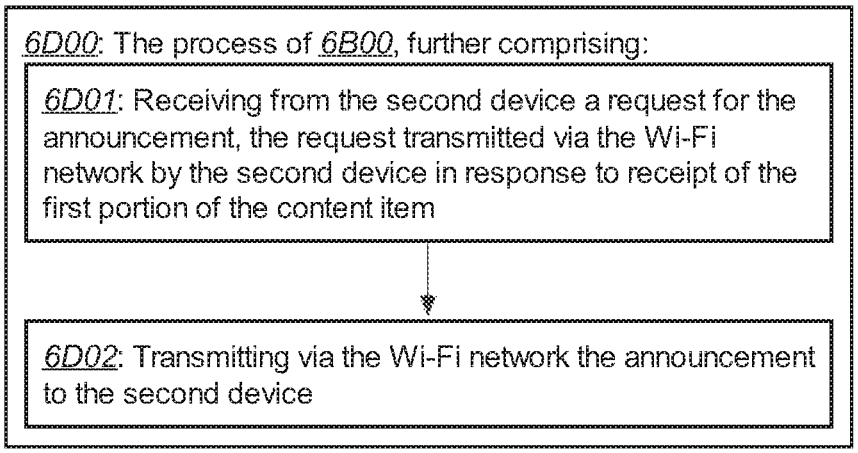

FIG. 6D is a flow diagram of example logic illustrating an extension of process 6B00 of FIG. 6B. More particularly, FIG. 6D illustrates a process 6D00 that includes the process 6B00, and which further includes the following block(s).

Block 6D01 includes receiving from the second device a request for the announcement, the request transmitted via the Wi-Fi network by the second device in response to receipt of the first portion of the content item. When the process randomly broadcasts a portion to the second device, the second device may have no knowledge of the content item being distributed. If such is the case, the second device will respond with a request for the announcement, so that the second device can determine the identity, source, nature, and/or purpose of the content item.

Block 6D02 includes transmitting via the Wi-Fi network the announcement to the second device. The announcement may be accompanied by the proofs as well. Alternatively the proofs may be transmitted in response to a specific request therefor.

Figure 6E:
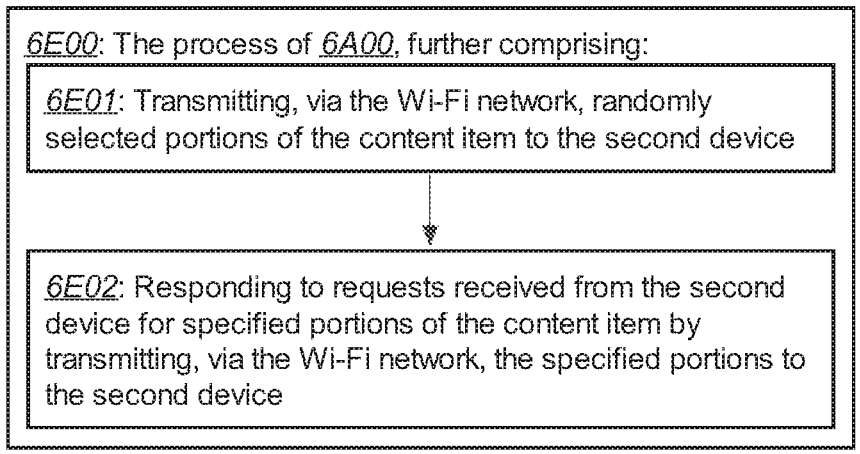

FIG. 6E is a flow diagram of example logic illustrating an extension of process 6A00 of FIG. 6A. More particularly, FIG. 6E illustrates a process 6E00 that includes the process 6A00, and which further includes the following block(s).

Block 6E01 includes transmitting, via the Wi-Fi network, randomly selected portions of the content item to the second device. The process concurrently performs two main operations during content item distribution. In this operation, the process repeatedly transmits randomly selected portions until some stopping condition is reached.

Block 6E02 includes responding to requests received from the second device for specified portions of the content item by transmitting, via the Wi-Fi network, the specified portions to the second device. In this operation, typically performed concurrently with the above, the process responds to any requests for specific content portions, such as those received from devices that are seeking missing portions that will serve to complete the entire content item. In some embodiments, a device that has received more than some threshold (e.g., 90%) of the portions that make up a particular content item will begin to broadcast requests for those missing portions. Responsive devices may employ a scheme that prevents multiple devices from responding to the request, such as waiting for a random time interval before responding, and then only responding if no other device has begun transmitting the requested portion. Alternatively or in addition, devices that are seeking missing portions can communicate with the content distributor (via the cellular network) in order to obtain the missing portions.

FIG. 6F is a flow diagram of example logic illustrating an extension of process 6A00 of FIG. 6A. More particularly, FIG. 6F illustrates a process 6F00 that includes the process 6A00, and which further includes the following block(s).

Block 6F01 includes repeatedly transmitting, via the Wi-Fi network, randomly selected portions of the content item, wherein the transmission is a broadcast transmission that reaches multiple other vehicle-based communication devices that are part of the Wi-Fi network. As discussed above, the transmission of content items via the Wi-Fi or other network is typically in the nature of a broadcast, so that multiple other devices that are in the range of the transmission can benefit from a single transmission.

FIG. 6G is a flow diagram of example logic for distributing content in a vehicle-based wireless network. This process is performed by a content distributor that seeks to distribute a content item to devices in a vehicle-based network. More particularly, FIG. 6G illustrates a process 6G00 that includes the following block(s).

Block 6G01 includes transmitting, via a cellular network, an announcement, proofs, and a content item to a first subset of devices in the vehicle-based wireless network, wherein the announcement is transmitted by a content distributor and identifies a content item, and wherein the proofs are configured to authenticate the content distributor and the content item. The content distributor first transmits the announcement, proofs, and at least some of the content item to some of the devices in the network. This data is transmitted via the cellular network, which is typically a cellular network, such as a 3G/4G network.

Block 6G02 includes causing devices in the first subset of devices to transmit, via a Wi-Fi network, portions of the content item to devices in a second subset of devices in the vehicle-based wireless network. Once a device in the network receives the announcement, corresponding proofs, and at least some of the content item, the device will begin to share portions of the content item via the Wi-Fi network. The devices in the second subset are those that have not received the announcement, proofs, or content item from the distributor. At this point, the content distributor waits to allow the content item (or at least portions thereof) to be shared throughout the network.

Block 6G03 includes transmitting, via the cellular network, remaining portions to the devices in the second subset of devices, wherein each remaining portion is one that has not been received by a device in the second subset of devices from any of the devices in the first subset of devices. After some time, the content distributor engages devices in the second subset, which never received the initial announcement or content item from the content distributor. The content distributor can thereby assure that the content item has been fully distributed by transmitting any missing portions to devices of the second subset.

FIG. 6H is a flow diagram of example logic illustrating an extension of process 6G00 of FIG. 6G. More particularly, FIG. 6H illustrates a process 6H00 that includes the process 6G00, and which further includes the following block(s).

Block 6H01 includes tracking distribution of the content item throughout the vehicle-based network. Tracking distribution of the content item can include sampling a randomly selected subset of devices to determine how much of the content item has been received by each device. By tracking distribution, the content distributor can determine how much and how quickly the content item is being shared across the network.

Block 6H02 includes in response to the distribution of the content item reaching a threshold level, transmitting the remaining portions to the devices in the second subset. For example, once the content item is 70% distributed (e.g., each device has received an average of 70% of the relevant portions), the distributor interacts with the devices in the second subset to assure that every device in the network receives the entire content item.

FIG. 6I is a flow diagram of example logic illustrating an extension of process 6G00 of FIG. 6G. More particularly, FIG. 6I illustrates a process 6I00 that includes the process 6G00, and which further includes the following block(s).

Block 6I01 includes receiving, by a roadside communication device and via the Wi-Fi network, a content portion from a first vehicle-based communication device, wherein the roadside communication device is located at a fixed position about a roadway traveled by a vehicle that carries the first device. Some embodiments include fixed position roadside devices that are configured to forward content portions from one vehicle to another. Some roadside devices may also have multiple communication interfaces, such that they can also communicate with the content distributor via a cellular network (or wireline network) to receive content which is to be forwarded to vehicle-based devices in the network.

Block 6I02 includes transmitting, by the roadside communication device and via the Wi-Fi network, the content portion to a second vehicle-based communication device. In this example, the roadside device operates in a similar manner to the vehicle-based devices, in that it receives content portions broadcast by passing vehicles, and then forwards those portions to other vehicles. As noted, the roadside device may also receive content directly from the content distributor, possibly via some other communication interface, such as wireline, cellular, or the like.

Figure 6J:
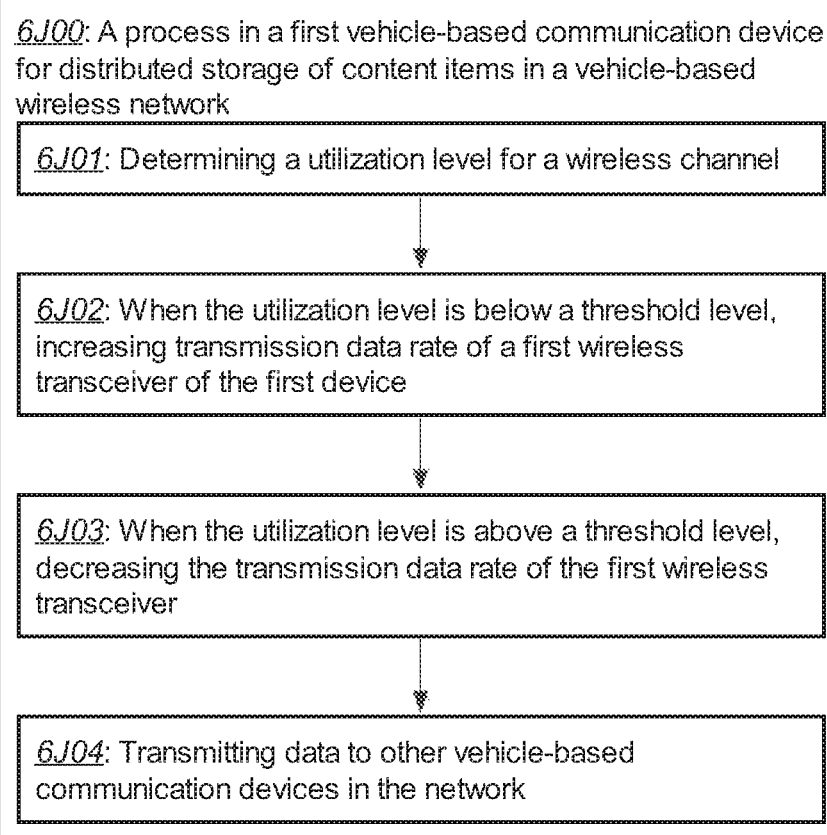

FIG. 6J is a flow diagram of example logic in a first vehicle-based communication device for distributed storage of content items in a vehicle-based wireless network. This process automatically adjusts the data transmission rate of a device in the network in order to improve network connectivity and overall performance, as discussed with respect to FIGS. 4A-4D and 5, above. More particularly, FIG. 6J illustrates a process 6J00 that includes the following block(s).

Block 6J01 includes determining a utilization level for a wireless channel used to communicate with other vehicle-based communication devices in the network. The channel is the frequency or frequency band that is used by the device to communicate with other devices. By listening on the channel, the process can determine the fraction of time that the channel is busy or idle. In this example, utilization is equated with idleness, although it is possible to use business instead, with a corresponding reversal of the logic described below.

Block 6J02 includes when the utilization level is below a threshold level, increasing transmission data rate of a first wireless transceiver of the first device. When utilization is measured as idle time, then the process will increase data rate when the channel is less than a threshold percentage idle (e.g., less than 50% idle). As noted, given the inverse relationship between data transmission rate and range, this will have the effect of shortening the transmission range.

Block 6J03 includes when the utilization level is above a threshold level, decreasing the transmission data rate of the first wireless transceiver. For example, when the channel is more than 50% idle, the process will decrease the transmission data rate, thereby increasing range.

Block 6J04 includes transmitting data to other vehicle-based communication devices in the network. The established data rate will be use for transmission. The above operations are typically repeatedly performed to dynamically adapt to changes in the network topology and utilization.

Figure 6K:
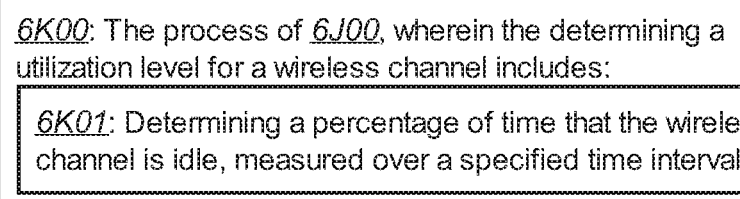

FIG. 6K is a flow diagram of example logic illustrating an extension of process 6J00 of FIG. 6J. More particularly, FIG.

6K illustrates a process 6K00 that includes the process 6J00, wherein the determining a utilization level for a wireless channel includes the following block(s).

Block 6K01 includes determining a percentage of time that the wireless channel is idle, measured over a specified time interval. Utilization can be determined by listening on the channel and measuring what percentage of time the channel is quiet over a time interval (e.g., 1, 5, 10 seconds).

FIG. 6L is a flow diagram of example logic illustrating an extension of process 6J00 of FIG. 6J. More particularly, FIG. 6L illustrates a process 6L00 that includes the process 6J00, and which further includes the following block(s).

Block 6L01 includes receiving, via a second wireless transceiver of the first device, a content item from a content distributor. As discussed above, typical devices have two communication interfaces, one for cellular communication (e.g., with the content distributor) and another for local communication with other devices/vehicles. Here the device receives content via the cellular interface, such as is described with respect to FIG. 3, above.

Block 6L02 includes transmitting, via the first wireless transceiver using the transmission data rate, portions of the content item to other vehicle-based communication devices in the network. The device then uses the established data rate to forward portions of the content item to other devices in the network via the Wi-Fi interface.

FIG. 6M is a flow diagram of example logic illustrating an extension of process 6J00 of FIG. 6J. More particularly, FIG. 6M illustrates a process 6M00 that includes the process 6J00, and which further includes the following block(s).

Block 6M01 includes automatically adjusting transmission data rate when the first device is in close proximity to other devices in the network, such that the first device transmits at a higher rate over a shorter distance relative to other devices in the network that that are not in close proximity to other devices. Proximity may be measured and expressed in various ways. For example, proximity may be an average distance to other vehicles (possibly within some maximum range). Those vehicles that are in close proximity to other vehicles will tend to be in a cluster, meaning that their channels will tend to be busy (not idle), which in turn will result in higher data rates (and shorted transmit ranges) by operation of the described techniques. Similarly, those in low proximity (high average distance to other devices) will tend to experience higher idle levels on their channels, which in turn will result in lower data rates (and longer transmit ranges). In the end, the described processes will cause clustered nodes to transmit quickly, while edge or fringe nodes to transmit far.

5. Example Computing System Implementation

Figure 7:
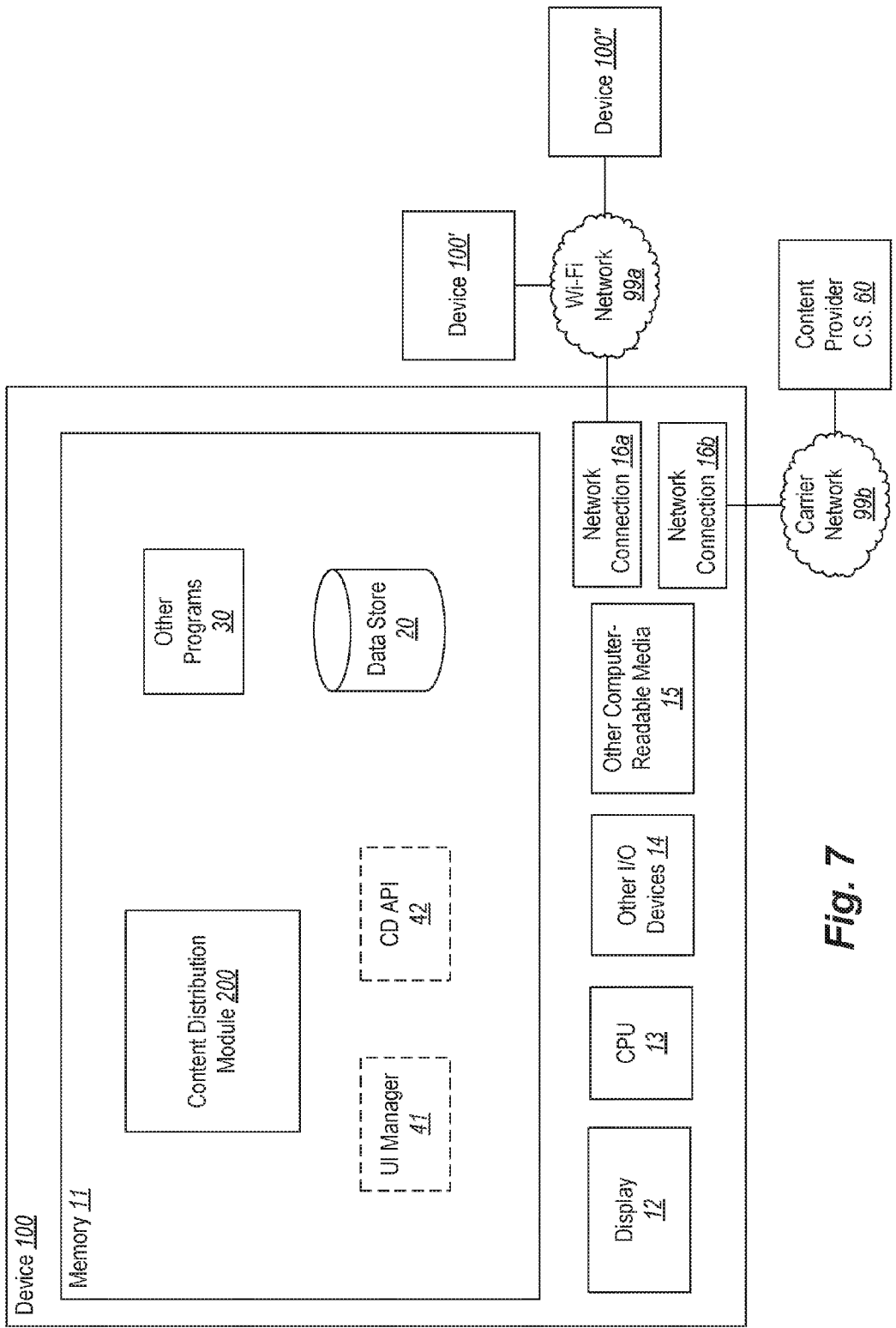
FIG. 7 is a block diagram of an example computing system or device for implementing and performing content distribution according to an example embodiment.

FIG. 7 is a block diagram of an example computing system or device for implementing and performing content distribution according to an example embodiment. In particular, FIG. 7 shows a computing system or device 100 that executes a content distribution module 200 that implements at least some of the techniques described herein. The device 100 may be, in the case of a vehicle-based network, installed in a car or other vehicle. In other contexts, the device 100 may be a mobile device, such as a tablet or smart phone.

Note that one or more general purpose or special purpose computing systems/devices may be used to implement and/or execute the module 200. However, just because it is possible to implement the manager on a general purpose computing system does not mean that the techniques themselves or the operations (taken alone or in combination) required to implement the techniques are conventional or well known. In addition, the computing system 100 may comprise one or more distinct computing systems/devices and may span distributed locations. Furthermore, each block shown may represent one or more such blocks as appropriate to a specific embodiment or may be combined with other blocks. Also, the module 200 may be implemented in software, hardware, firmware, or in some combination to achieve the capabilities described herein.

In the embodiment shown, computing system 100 comprises a computer memory ("memory") 11, a display 12, one or more Central Processing Units ("CPU") 13, Input/Output devices 14 (e.g., keyboard, mouse, CRT or LCD display, and the like), other computer-readable media 15, and network connections 16a and 16b. The module 200 is shown residing in memory 11. In other embodiments, some portion of the contents, some or all of the components of the module 200 may be stored on and/or transmitted over the other computer-readable media 15. The module 200 preferably executes on one or more CPUs 13 and performs the techniques described herein. Other code or programs 30 (e.g., an administrative interface, a Web server, and the like) and potentially other data repositories, such as data repository 20, also reside in the memory 11, and preferably execute on one or more CPUs 13. Of note, one or more of the components in FIG. 7 may not be present in any specific implementation. For example, some embodiments may not provide other computer readable media 15 or a display 12.

The module 200 interacts using network connection 16a via a Wi-Fi network 99a with other devices 100' and 100". The module 200 also interacts using network connection 16b via a carrier network 99b with a content provider computing system 60. The other devices 100' and 100" are constituted similarly to device 100. One or more of devices 100' and 100" may be located at fixed positions, such as at the side of a roadway (e.g., mounted on a utility pole or traffic signal).

The module 200 is shown executing in the memory 11 of the device 100. Also included in the memory 11 are a user interface manager 41 and an application program interface ("API") 42. The user interface manager 41 and the API 42 are drawn in dashed lines to indicate that in other embodiments, functions performed by one or more of these components may be performed externally to the module 200.

The UI manager 41 provides a view and a controller that facilitate user interaction with the module 200 and its various components. For example, the UI manager 41 may provide interactive access to the module 200, such that users or administrators can interact with the module 200, such as by modifying configuration settings, viewing logs, or the like. In some embodiments, access to the functionality of the UI manager 41 may be provided via a Web server, possibly executing as one of the other programs 30. In such embodiments, a user operating a Web browser executing the network management system 55 can interact with the module 200 via the UI manager 41.

The API 42 provides programmatic access to one or more functions of the module 200. For example, the API 42 may provide a programmatic interface to one or more functions of the module 200 that may be invoked by one of the other programs 30 or some other module. In this manner, the API 42 facilitates the development of third-party software, such as user interfaces, plug-ins, adapters (e.g., for integrating functions of the module 200 into Web applications), and the like.

In addition, the API 42 may be in at least some embodiments invoked or otherwise accessed via remote entities, such as code executing on one of the network devices 100' and 100" and/or the content provider computing system 60, to access various functions of the module 200. For example, the system 60 may transmit an announcement, a proof, a content portion, or other data item via the API 42. The system 60 may also interrogate the module 200 for state information, including the how many content portions have been received, log messages, or the like.

In an example embodiment, components/modules of the module 200 are implemented using software programming techniques. For example, the module 200 may be implemented as a "native" executable running on the CPU 13, along with one or more static or dynamic libraries. In other embodiments, the module 200 may be implemented as instructions processed by a virtual machine that executes as one of the other programs 30. In general, a range of programming languages may be employed for implementing such example embodiments, including representative implementations of various programming language paradigms, including but not limited to, object-oriented (e.g., Java, C++, C#, Visual Basic.NET, Smalltalk, and the like), functional (e.g., ML, Lisp, Scheme, and the like), procedural (e.g., C, Pascal, Ada, Modula, and the like), scripting (e.g., Perl, Ruby, Python, JavaScript, VBScript, and the like), and declarative (e.g., SQL, Prolog, and the like).

The various components may be implemented using more monolithic programming techniques, for example, as an executable running on a single CPU computer system, or alternatively decomposed using a variety of structuring techniques, including but not limited to, multiprogramming, multithreading, client-server, or peer-to-peer, running on one or more computer systems each having one or more CPUs. Some embodiments may execute concurrently and asynchronously, and communicate using message passing, remote procedure call, or other distributed computing paradigms. Equivalent synchronous embodiments are also supported. Also, other functions could be implemented and/or performed by each component/module, and in different orders, and by different components/modules, yet still achieve the described functions.

In addition, programming interfaces to the data stored as part of the module 200, such as in the data store 20, can be available by language-specific APIs; libraries for accessing files, databases, or other data repositories; through representational languages such as XML; or through Web servers, FTP servers, or other types of servers providing access to stored data. The data store 20 may be implemented as one or more database systems, file systems, or any other technique for storing such information, or any combination of the above, including implementations using distributed computing techniques.

Different configurations and locations of programs and data are contemplated for use with techniques of described herein. A variety of distributed computing techniques are appropriate for implementing the components of the illustrated embodiments in a distributed manner including but not limited to TCP/IP sockets, RPC, RMI, HTTP, Web Services (XML-RPC, JAX-RPC, SOAP, and the like). Other variations are possible. Also, other functionality could be provided by each component/module, or existing functionality could be distributed amongst the components/modules in different ways, yet still achieve the functions described herein.

Furthermore, in some embodiments, some or all of the components of the module 200 may be implemented or provided in other manners, such as at least partially in firmware and/or hardware, including, but not limited to one or more application-specific integrated circuits ("ASICs"), standard integrated circuits, controllers executing appropriate instructions, and including microcontrollers and/or embedded controllers, field-programmable gate arrays ("FPGAs"), complex programmable logic devices ("CPLDs"), and the like. Some or all of the system components and/or data structures may also be stored as contents (e.g., as executable or other machine-readable software instructions or structured data) on a computer-readable medium (e.g., as a hard disk; a memory; a computer network or cellular wireless network or other data transmission medium; or a portable media article to be read by an appropriate drive or via an appropriate connection, such as a DVD or flash memory device) so as to enable or configure the computer-readable medium and/or one or more associated computing systems or devices to execute or otherwise use or provide the contents to perform at least some of the described techniques. Some or all of the components and/or data structures may be stored on tangible, non-transitory storage mediums. Some or all of the system components and data structures may also be stored as data signals (e.g., by being encoded as part of a carrier wave or included as part of an analog or digital propagated signal) on a variety of computer-readable transmission mediums, which are then transmitted, including across wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of this disclosure may be practiced with other computer system configurations.

While embodiments of the invention have been illustrated and described, as noted above, many changes can be made without departing from the spirit and scope of the invention. Accordingly, the scope of the invention is not limited by the above disclosure.

The invention claimed is:

1. A system for distributing content in a vehicle-based wireless network, the system comprising:
   a first vehicle-based communication device having a first wireless transceiver,
   wherein the first device is configured to:
      determine a utilization level for a wireless channel used to communicate with other vehicle-based communication devices in the network;
      when the utilization level is below a threshold level, increase transmission data rate of the first wireless transceiver;
      when the first device detects that the wireless channel is idle more than 50% of the time, decrease the transmission data rate, thereby increasing the effective transmission range of the first wireless transceiver;
      when the utilization level is above a threshold level, decrease the transmission data rate of the first wireless transceiver; and
      transmit data to other vehicle-based communication devices in the network.

2. The system of claim 1, wherein the utilization level is a measure of idle time on the wireless channel.

3. The system of claim 1, wherein the utilization level is a percentage of time that the wireless channel is idle, measured over a specified time interval.

4. The system of claim 1, wherein the threshold level is 50%.

5. The system of claim 1, wherein the first device is further configured to: when the first device detects that the wireless channel is idle less than 50% of the time, increase the transmission data rate, thereby decreasing the effective transmission range of the first wireless transceiver.

6. The system of claim 1, wherein the first device further includes a second wireless transceiver, and wherein the first device is further configured to:
- receive, via the second wireless transceiver, a content item from a content distributor; and
- transmit, via the first wireless transceiver using the transmission data rate, portions of the content item to other vehicle-based communication devices in the network.

7. The system of claim 1, wherein the first device is further configured to: sample utilization of the channel in order to determine the utilization level.

8. The system of claim 1, wherein the vehicle-based wireless network includes multiple vehicle-based devices that are each configured to automatically adjust transmission data rates, such that devices in close proximity to other devices transmit data at higher rates over shorter distances relative to those devices that that are not in close proximity to other devices.

9. A method in a first vehicle-based communication device for distributed storage of content items in a vehicle-based wireless network, the method comprising:
- determining a utilization level for a wireless channel used to communicate with other vehicle-based communication devices in the network;
- when the utilization level is below a threshold level, increasing transmission data rate of a first wireless transceiver of the first device;
- when the utilization level is above a threshold level, decreasing the transmission data rate of the first wireless transceiver;
- when the first device detects that the wireless channel is idle more than 50% of the time, decreasing the transmission data rate, thereby increasing the effective transmission range of the first wireless transceiver; and
- transmitting data to other vehicle-based communication devices in the network.

10. The method of claim 9, wherein the determining a utilization level for a wireless channel includes: measuring idle time on the wireless channel.

11. The method of claim 9, wherein the determining a utilization level for a wireless channel includes: determining a percentage of time that the wireless channel is idle, measured over a specified time interval.

12. The method of claim 9, further comprising: when the first device detects that the wireless channel is idle less than 50% of the time, increasing the transmission data rate, thereby decreasing the effective transmission range of the wireless transceiver.

13. The method of claim 9, further comprising:
- receiving, via a second wireless transceiver of the first device, a content item from a content distributor; and
- transmitting, via the first wireless transceiver using the transmission data rate, portions of the content item to other vehicle-based communication devices in the network.

14. The method of claim 9, further comprising: sampling utilization of the channel in order to determine the utilization level.

15. The method of claim 9, further comprising: automatically adjusting transmission data rate when the first device is in close proximity to other devices in the network, such that the first device transmits at a higher rate over a shorter distance relative to other devices in the network that that are not in close proximity to other devices.

16. A non-transitory computer-readable medium including contents that are configured, when executed, to cause a first vehicle-based communication device to perform a method for distributing content in a vehicle-based wireless network, the method comprising:
- determining a utilization level for a wireless channel used to communicate with other vehicle-based communication devices in the network;
- when the utilization level is below a threshold level, increasing transmission data rate of a first wireless transceiver of the first device;
- when the utilization level is above a threshold level, decreasing the transmission data rate of the first wireless transceiver;
- when the first device detects that the wireless channel is idle more than 50% of the time decreasing the transmission data rate, thereby increasing the effective transmission range of the first wireless transceiver; and
- transmitting data to other vehicle-based communication devices in the network.

17. The non-transitory computer-readable medium of claim 16, wherein the method further comprises:
- receiving, via a second wireless transceiver of the first device, a content item from a content distributor;
- verifying a source and integrity of the content item based on proofs received from the content distributor; and
- transmitting, via the first wireless transceiver using the transmission data rate, randomly selected portions of the content item to other vehicle-based communication devices in the network.

18. The non-transitor computer-readable medium of claim 17,
- wherein the first wireless transceiver communicates over a Wi-Fi network; and
- wherein the second wireless transceiver communicates over a cellular network.

19. The non-transitory computer-readable medium of claim 16, wherein the method further comprises:
- when the first device detects that the wireless channel is idle less than 50% of the time, increasing the transmission data rate, thereby decreasing the effective transmission range of the wireless transceiver.

20. The non-transitory computer-readable medium of claim 16, wherein the method further comprises:
- automatically adjusting transmission data rate when the first device is in close proximity to other devices in the network, such that the first device transmits at a higher rate over a shorter distance relative to other devices in the network that that are not in close proximity to other devices.

* * * * *